(12) United States Patent
Broomer et al.

(10) Patent No.: US 11,473,437 B2
(45) Date of Patent: Oct. 18, 2022

(54) TURBINE SNAP IN SPRING SEAL

(71) Applicant: General Electric Company, Schenectady, NY (US)

(72) Inventors: Mark Broomer, Boston, MA (US); Tyler Frederick Hooper, Amesbury, MA (US); Jason Michael Ulberg, Swampscott, MA (US)

(73) Assignee: General Electric Company, Schenectady, NY (US)

( * ) Notice: Subject to any disclaimer, the term of this patent is extended or adjusted under 35 U.S.C. 154(b) by 319 days.

(21) Appl. No.: 16/576,933

(22) Filed: Sep. 20, 2019

(65) Prior Publication Data

US 2020/0141256 A1 May 7, 2020

Related U.S. Application Data

(63) Continuation-in-part of application No. 14/864,221, filed on Sep. 24, 2015, now abandoned.

(51) Int. Cl.
  *F01D 11/00* (2006.01)
  *F01D 25/24* (2006.01)
  (Continued)

(52) U.S. Cl.
  CPC .......... *F01D 11/005* (2013.01); *F01D 25/246* (2013.01); *F01D 9/041* (2013.01);
  (Continued)

(58) Field of Classification Search
  CPC ............. F05D 2220/32; F05D 2240/55; F01D 11/006; F01D 11/08; F01D 11/005; F05B 2240/11; F16J 15/04; F16J 15/0887
  See application file for complete search history.

(56) References Cited

U.S. PATENT DOCUMENTS

| 3,895,812 A | 7/1975 | Harr |
| 4,199,151 A | 4/1980 | Bartos |
| (Continued) | | |

FOREIGN PATENT DOCUMENTS

| CN | 1219215 A | 6/1999 |
| CN | 1673581 A | 9/2005 |
| (Continued) | | |

OTHER PUBLICATIONS

Chinese Office Action Corresponding to CN Application No. 201610843618.3 dated Jan. 2, 2018.

(Continued)

*Primary Examiner* — Eugene G Byrd
(74) *Attorney, Agent, or Firm* — McGarry Bair PC

(57) ABSTRACT

In one aspect, a sealing assembly for a turbine of a gas turbine engine includes a first turbine component having a first surface and a second surface positioned aft of the first surface. The first turbine component, in turn, defines a slot positioned between the first surface and the second surface. Furthermore, the sealing assembly includes a second turbine component positioned aft of the first turbine component such that the first component and the second component define a gap therebetween. Additionally, the sealing assembly includes a seal configured to seal the gap defined between the first turbine component and the second turbine component. The seal includes a first portion positioned within the slot such that the first portion exerts a sealing force on the second surface of the first component. Moreover, the seal further includes a second portion that exerts a sealing force on the second component.

20 Claims, 8 Drawing Sheets

(51) Int. Cl.
*F02C 7/28* (2006.01)
*F01D 9/04* (2006.01)
*F01D 11/08* (2006.01)
*F16J 15/08* (2006.01)

(52) U.S. Cl.
CPC ............... *F01D 11/08* (2013.01); *F02C 7/28* (2013.01); *F05D 2220/323* (2013.01); *F05D 2230/60* (2013.01); *F05D 2240/11* (2013.01); *F05D 2240/128* (2013.01); *F05D 2240/35* (2013.01); *F05D 2240/57* (2013.01); *F05D 2260/20* (2013.01); *F16J 15/0887* (2013.01)

(56) References Cited

U.S. PATENT DOCUMENTS

| | | | | |
|---|---|---|---|---|
| 4,457,523 A * | 7/1984 | Hailing | F16J 15/021 | 277/644 |
| 4,645,217 A * | 2/1987 | Honeycutt, Jr. | F01D 11/005 | 277/555 |
| 4,813,692 A * | 3/1989 | Hailing | F16J 15/021 | 277/626 |
| 5,145,334 A | 9/1992 | Gutknecht | | |
| 5,249,814 A | 10/1993 | Hailing | | |
| 5,400,586 A * | 3/1995 | Bagepalli | F16J 15/3288 | 60/800 |
| 5,524,846 A * | 6/1996 | Shine | B64D 27/00 | 244/121 |
| 5,738,490 A * | 4/1998 | Pizzi | F01D 11/08 | 415/139 |
| 5,987,879 A * | 11/1999 | Ono | F01D 9/023 | 60/800 |
| 5,988,975 A | 11/1999 | Pizzi | | |
| 6,193,240 B1 * | 2/2001 | Johnson | F01D 11/005 | 277/643 |
| 6,402,466 B1 * | 6/2002 | Burdgick | F01D 11/005 | 415/173.3 |
| 6,431,555 B1 * | 8/2002 | Schroder | F01D 11/005 | 277/628 |
| 6,431,825 B1 * | 8/2002 | McLean | F01D 11/005 | 277/644 |
| 6,464,457 B1 * | 10/2002 | Morgan | F01D 11/005 | 277/630 |
| 6,869,082 B2 * | 3/2005 | Parker | F23R 3/60 | 277/630 |
| 7,004,478 B2 * | 2/2006 | Spence | F16J 15/0887 | 277/626 |
| 7,140,840 B2 * | 11/2006 | Taillant | F01D 11/005 | 415/191 |
| 7,172,388 B2 * | 2/2007 | Synnott | F01D 11/003 | 277/637 |
| 7,217,089 B2 * | 5/2007 | Durocher | F01D 11/005 | 415/170.1 |
| 7,246,995 B2 * | 7/2007 | Zborovsky | F01D 9/023 | 415/137 |
| 7,360,988 B2 * | 4/2008 | Lee | F01D 9/00 | 29/889.22 |
| 7,421,842 B2 * | 9/2008 | Parker | F23R 3/60 | 277/654 |
| 7,530,233 B2 | 5/2009 | Milazar | | |
| 7,631,501 B2 * | 12/2009 | Boston | F02C 7/28 | 60/752 |
| 7,699,320 B2 | 4/2010 | Iguchi et al. | | |
| 7,784,264 B2 | 8/2010 | Weaver et al. | | |
| 7,976,274 B2 | 7/2011 | Lee et al. | | |
| 8,215,115 B2 | 7/2012 | Adair et al. | | |
| 8,226,360 B2 | 7/2012 | Scoggins et al. | | |
| 9,011,089 B2 | 4/2015 | Solanki et al. | | |
| 9,038,394 B2 * | 5/2015 | Flanagan | F23R 3/002 | 60/752 |
| 9,366,444 B2 | 6/2016 | Salunkhe et al. | | |
| 9,416,969 B2 * | 8/2016 | Weaver | F01D 9/04 | |
| 2006/0045746 A1 | 3/2006 | Synnott | | |
| 2007/0025841 A1 * | 2/2007 | Milazar | F16J 15/0887 | 415/134 |
| 2007/0237624 A1 * | 10/2007 | Nigmatulin | F02C 7/28 | 415/115 |
| 2008/0053107 A1 * | 3/2008 | Weaver | F01D 9/023 | 60/800 |
| 2008/0073861 A1 | 3/2008 | Iguchi et al. | | |
| 2009/0169369 A1 * | 7/2009 | Morgan | F01D 9/023 | 415/174.2 |
| 2011/0072830 A1 | 3/2011 | Adair et al. | | |
| 2011/0179798 A1 | 7/2011 | Pieussergues et al. | | |
| 2012/0237343 A1 * | 9/2012 | Matsuyama | F02C 7/28 | 415/182.1 |
| 2012/0263585 A1 * | 10/2012 | Matsuyama | F16J 15/0887 | 415/204 |
| 2012/0321450 A1 * | 12/2012 | Aschenbruck | F01D 11/005 | 415/174.2 |
| 2013/0302148 A1 | 11/2013 | Solanki et al. | | |
| 2013/0341426 A1 * | 12/2013 | Barry, Jr. | F02C 7/28 | 239/265.19 |
| 2014/0241858 A1 * | 8/2014 | Tashiro | F04D 29/083 | 415/111 |
| 2014/0361493 A1 * | 12/2014 | Short | F16L 23/20 | 277/549 |
| 2015/0128610 A1 * | 5/2015 | Salunkhe | F01D 9/023 | 60/800 |
| 2017/0268371 A1 * | 9/2017 | McCaffrey | F01D 25/08 | |
| 2018/0298772 A1 * | 10/2018 | Ratajac | F16J 15/128 | |
| 2019/0128188 A1 * | 5/2019 | Lee | F23R 3/283 | |

FOREIGN PATENT DOCUMENTS

| | | |
|---|---|---|
| CN | 1853032 A | 10/2006 |
| EP | 0277724 A2 | 8/1988 |
| EP | 0875721 A1 | 11/1998 |
| EP | 1779168 B1 | 2/2012 |
| EP | 1270875 B1 | 2/2013 |
| EP | 2180160 B1 | 4/2014 |

OTHER PUBLICATIONS

European Search Report Corresponding to EP Application No. 16189789.7 dated Feb. 7, 2017.

* cited by examiner

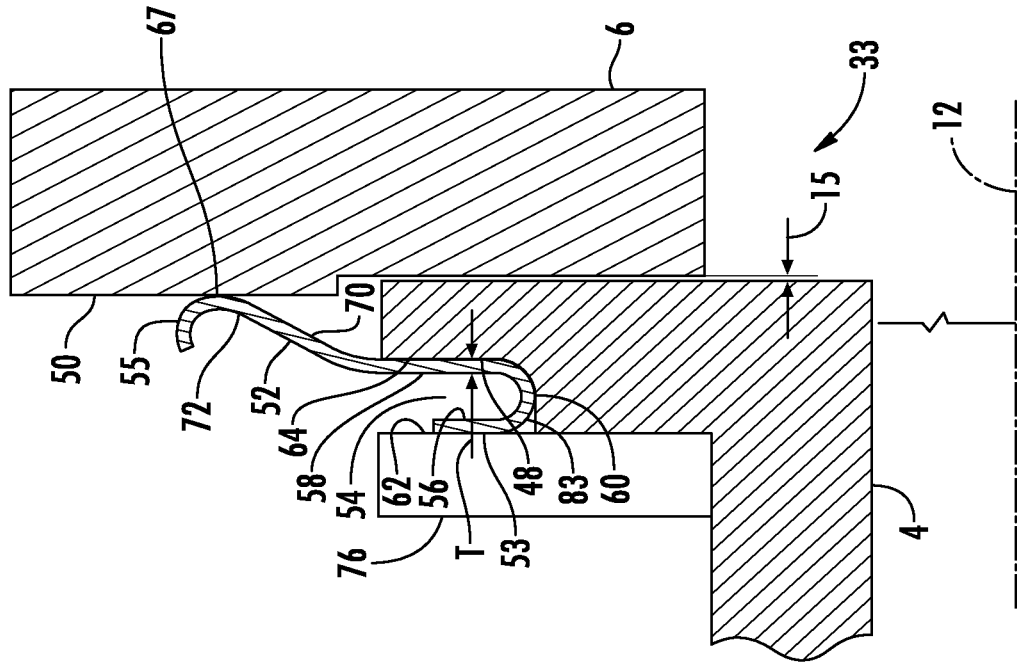
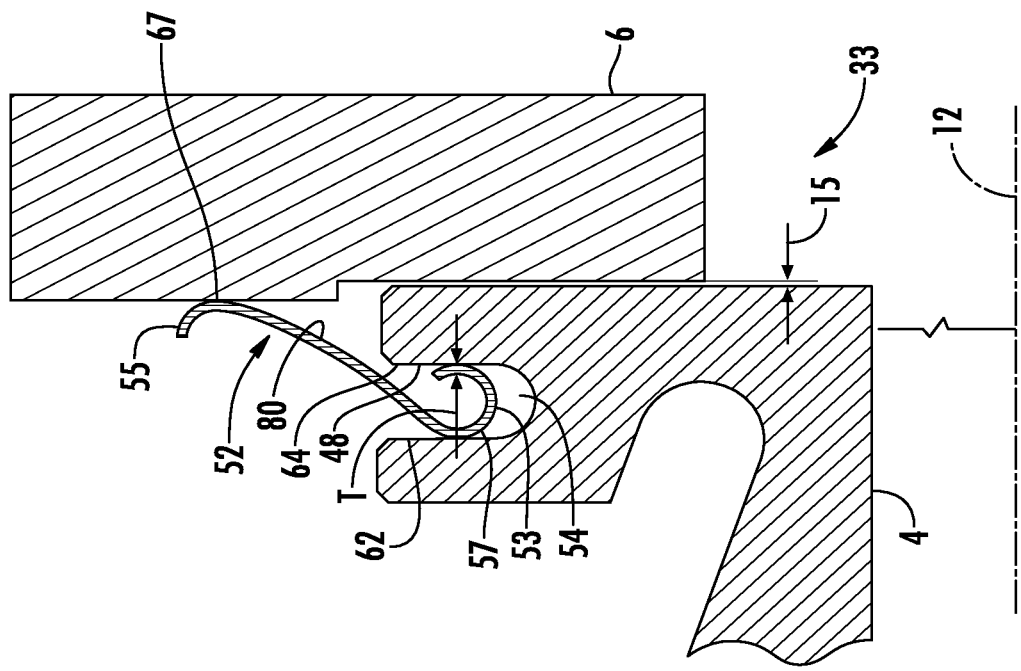

ated into position in the engine. Accordingly, gaps are necessarily provided therebetween for both assembly purposes as well as for accommodating differential thermal expansion and contraction during operation of the engine. Gaps between these stationary stator components are suitably sealed for preventing leakage therethrough. In a typical high-pressure turbine nozzle, a portion of the compressor air is bled and channeled through the nozzle vanes for cooling thereof. The use of bleed air reduces the overall efficiency of the engine and, therefore, is minimized whenever possible. The bleed air is at a relatively high pressure compared to the static pressure of the combustion gases flowing through the turbine nozzle and, therefore, would leak into the exhaust flow path without providing suitable seals between the stator components.

TURBINE SNAP IN SPRING SEAL

CROSS-REFERENCE TO RELATED APPLICATIONS

This application is a continuation-in-part of U.S. patent application Ser. No. 14/864,221 filed Sep. 24, 2015, now abandoned, the disclosure of which is hereby incorporated by reference herein in its entirety for all purposes.

FIELD

The present disclosure relates generally to gas turbine engine turbine flow path seals and, more specifically, to spring seals for sealing between turbine components or elements.

BACKGROUND

Gas turbine engine high pressure turbines typically include turbine nozzles upstream of turbine shrouds that are separately manufactured and assembled into position in the engine. Accordingly, gaps are necessarily provided therebetween for both assembly purposes as well as for accommodating differential thermal expansion and contraction during operation of the engine. Gaps between these stationary stator components are suitably sealed for preventing leakage therethrough. In a typical high-pressure turbine nozzle, a portion of the compressor air is bled and channeled through the nozzle vanes for cooling thereof. The use of bleed air reduces the overall efficiency of the engine and, therefore, is minimized whenever possible. The bleed air is at a relatively high pressure compared to the static pressure of the combustion gases flowing through the turbine nozzle and, therefore, would leak into the exhaust flow path without providing suitable seals between the stator components.

Arcuate leaf seals are particularly useful to seal these gaps in the turbine flow paths between turbine nozzles and shrouds. The leaf seals typically used in such applications are arcuate and disposed end to end around the circumference of the stator components which are segmented. For example, the radially outer band of the turbine nozzle includes axially spaced apart forward and aft rails. These rails extend radially outwardly with the aft rail abutting a complementary surface on the adjoining shroud or shroud hanger for providing a primary friction seal therewith.

W-seals and C-seals are frequently used in cavities formed by interfacing hardware. Assembly forces can damage seals during installation. Seals can also be inadvertently left out of assemblies.

Mounting arrangements for the leaf seals are relatively complex and subject to damage during the assembly process in view of the relatively close quarters in this region. Leaf seals are also ineffective at smaller radii, such as radii less than ten inches. A smaller and less complex seal is desired for simplifying the manufacture and assembly thereof and eliminating pinching and damage that may occur during assembly.

BRIEF DESCRIPTION

Aspects and advantages of the invention will be set forth in part in the following description, or may be obvious from the description, or may be learned through practice of the invention.

In one aspect, the present disclosure is directed to a sealing assembly for a turbine of a gas turbine engine. The sealing assembly includes a first turbine component including a first surface and a second surface positioned aft of the first surface along an axial centerline of the gas turbine engine. The first turbine component also defines a slot positioned between the first surface and the second surface along the axial centerline. Furthermore, the sealing assembly includes a second turbine component positioned aft of the first turbine component along the axial centerline such that the first component and the second component define a gap therebetween. Additionally, the sealing assembly includes a seal configured to seal the gap defined between the first turbine component and the second turbine component. The seal includes a first portion positioned within the slot such that the first portion exerts a sealing force on the second surface of the first component. Moreover, the seal further includes a second portion that exerts a sealing force on the second component.

In another aspect, the present disclosure is directed to a gas turbine engine. The gas turbine engine includes a compressor, a combustor, and a turbine. The turbine, in turn, includes first turbine component having a first surface and a second surface positioned aft of the first surface along an axial centerline of the gas turbine engine. The first turbine component also defines a slot positioned between the first surface and the second surface along the axial centerline. Furthermore, the sealing assembly includes a second turbine component positioned aft of the first turbine component along the axial centerline such that the first component and the second component define a gap therebetween. Additionally, the sealing assembly includes a seal configured to seal the gap defined between the first turbine component and the second turbine component. The seal includes a first portion positioned within the slot such that the first portion exerts a sealing force on the second surface of the first component. Moreover, the seal further includes a second portion that exerts a sealing force on the second component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1B is a sectional illustration of an exemplary gas turbine engine snap in annular seal having a first end spring-loaded in a U-shaped slot of a first component and a second end spring-loaded against a second component and radially inwardly and axially aftwardly bowed section connecting the first and second ends.

FIG. 2 is a sectional view illustration of a second exemplary gas turbine engine sprung seal having a first end spring-loaded in a U-shaped slot of a first component and a second end spring-loaded against a second component.

Figure 1A:
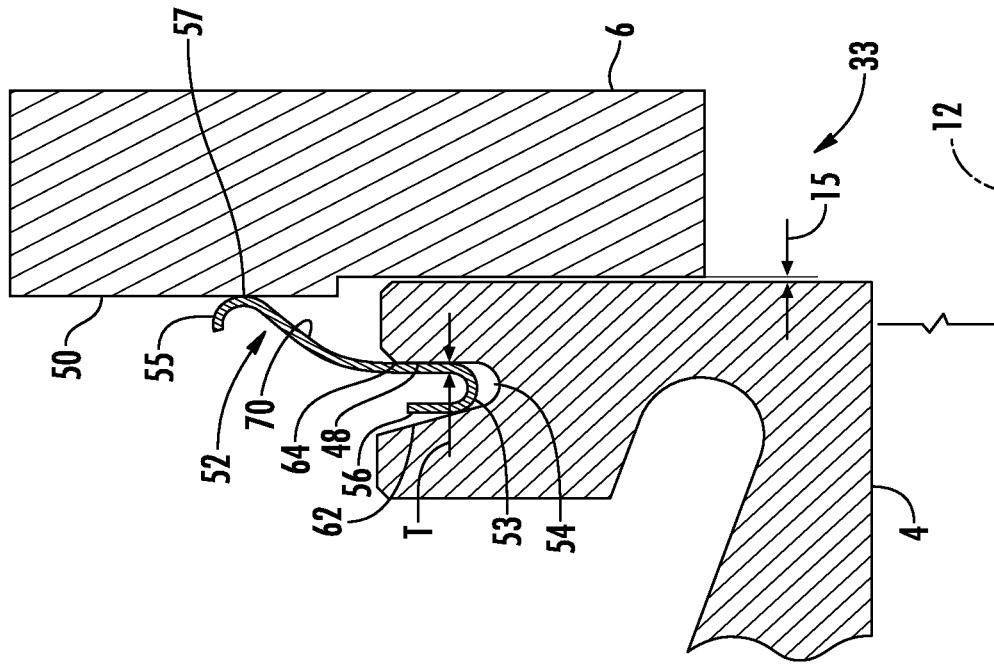
FIG. 1A is a sectional illustration of an exemplary gas turbine engine snap in annular seal having a first end spring-loaded in a V-shaped slot of a first component and a second end spring-loaded against a second component and radially inwardly and axially aftwardly bowed section connecting the first and second ends.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
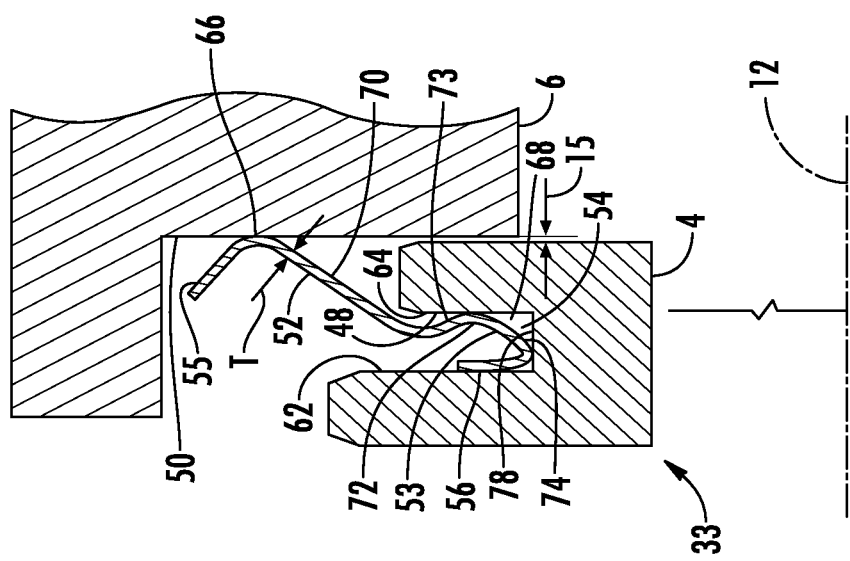
FIG. 1 is a sectional illustration of a first exemplary gas turbine engine snap in annular seal having a first end spring-loaded in a U-shaped slot of a first component and a second end spring-loaded against a second component.
Figure 2A:
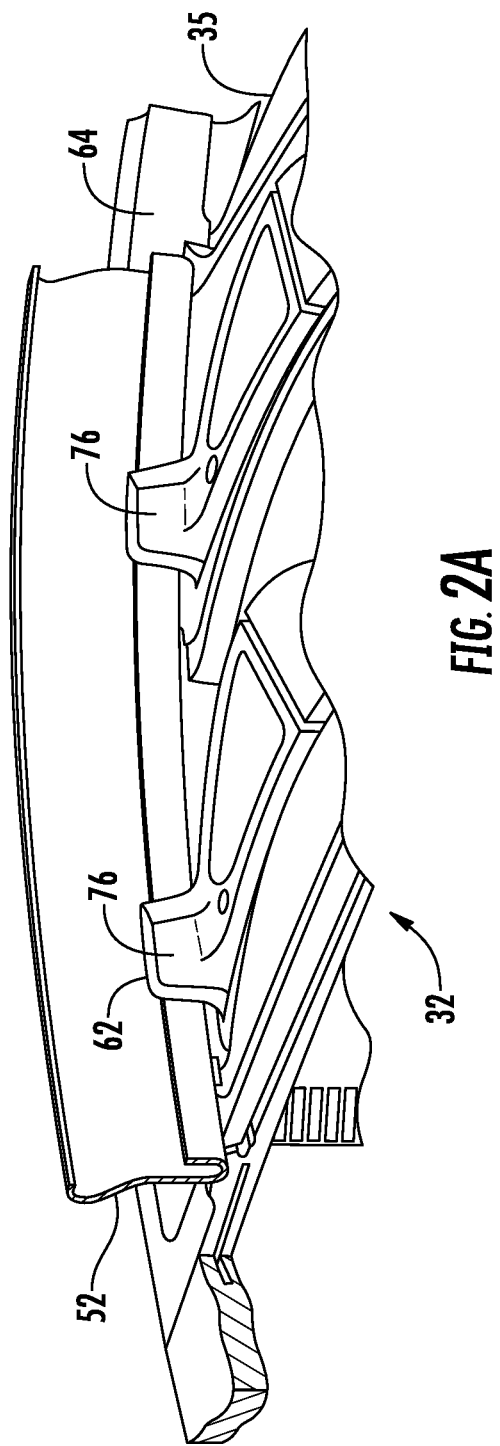
FIG. 2A is a perspective view illustration of tabs used to hold the second exemplary gas turbine engine sprung seal illustrated in FIG. 2.

Illustrated in FIGS. 1-2A is a gas turbine engine annular seal assembly 33 including a snap in annular spring seal 52 extending radially and circumferentially between and in sealing engagement with first and second annular turbine components 4, 6 circumscribed about a centerline axis 12. The seal assembly 33 is designed to prevent or inhibit leakage through a gap 15 between the first and second turbine components 4, 6 of a gas turbine engine. Gas turbine engines include aircraft, marine, and industrial gas turbine engines.

The snap in annular spring seal 52 includes a radially inner first seal end 53 spring-loaded and revolvably secured in at least one slot 54 of the first turbine component 4. Thus, the first seal end 53 is in sealing engagement against an aft facing first sealing surface 48 on the first turbine component 4. The exemplary slot 54 illustrated in FIG. 1 is cross-sectionally U-shaped. The inner first seal end 53 is spring-loaded against and between parallel forward and aft annular walls 62, 64 of the U-shaped slot 54 of the first turbine component 4. An alternatively shaped exemplary slot 54 illustrated in FIG. 1A is cross-sectionally V-shaped and an inner first seal end 53 is spring-loaded against and between non-parallel forward and aft annular walls 62, 64 of the V-shaped slot 54 of the first turbine component 4.

The annular snap in spring seal 52 includes a radially outer second seal end 55 spaced radially outwardly of the first end 53. The second seal end 55 is connected to the first end 53 by an axially aftwardly opening conical section 70. The conical section 70 provides an axial biasing means for axially biasing or urging the second seal end 55 apart and away from the first end 53 and in sealing engagement against an aft facing second sealing surface 50 on the second component 6. The radially outer second seal end 55 is spring-loaded and in sealing engagement against the second component. The second seal end 55 may include a radially outer aftwardly opening V-shaped cross-sectional bend 66 in sealing engagement and contact with the second component 6 as illustrated in FIG. 1 or a more rounded circular cross-sectional bend 67 as illustrated in FIG. 2.

The annular snap in spring seal 52 further includes an axially aftwardly opening conical section 70 located radially between and connected to the radially outer aftwardly opening V-shaped cross-sectional bend 66 and a radially inner V-shaped cross-sectional bend 68 at a radially inner end 72 of the first seal end 53. The annular snap in spring seal 52 is able to conform to the at least one U-shaped slot 54 of the first turbine component 4 and flexibly seal against the second component 6. The spring seal 52 may be made of a variety of metallic materials including but not limited to Inconel Alloy X750, Rene 41, Inconel Alloy 718, Inconel Alloy 625, Waspaloy, or any other alloy of appropriate stiffness and temperature capability. The spring seal 52 may have a range of thicknesses and stiffnesses. The spring seal 52 may have a thickness T in a range of from 0.002 inches-0.030 inches and may vary from feature to feature within a given seal.

A first exemplary embodiment of the annular snap in spring seal 52 illustrated in FIG. 1 includes a radially inner first seal end 53 spring-loaded and revolvably secured in the at least one U-shaped slot 54. The first seal end 53 includes an annular axially forward leg 56 that rests parallel to and against the forward wall 62. The radially inner V-shaped cross-sectional bend 68 includes an axially aftwardly opening conical connecting section 74 axially aft of and connected to the axially forward leg 56. The axially aftwardly opening conical connecting section 74 is connected to the axially aftwardly opening conical section 70 by a forwardly opening conical intermediate section 73. The conical connecting section 74 may be caddy-corner to both the aft annular wall 64 and a cylindrical bottom wall 78 of the U-shaped slot 54. The shape of the first end 53 is designed to provide a strong spring force within the at least one U-shaped slot 54 and be easily removed from the slot. The first end 53 is spring-loaded against and between parallel forward and aft annular walls 62, 64 of the U-shaped slot 54 of the first turbine component 4.

Another exemplary embodiment of the annular snap in spring seal 52 illustrated in FIG. 1B includes a radially inner circular cross-sectional first seal end 53 spring-loaded and revolvably secured in the at least one U-shaped slot 54. A radially outer circular cross-sectional second seal end 55 is spaced radially outwardly of the first end 53. The first end 53 is spring-loaded against and between parallel forward and aft annular walls 62, 64 of the U-shaped slot 54 of the first turbine component 4. The second seal end 55 is connected to the first end 53 by a radially inwardly and axially aftwardly bowed section 80. The bowed section 80 provides an axial biasing means for axially biasing or urging the second seal end 55 apart and away from the first end 53 and in sealing engagement against the second component 6. The radially inner circular cross-sectional first seal end 53 and the radially outer circular cross-sectional second seal end 55 have axially and radially extending circular cross-sections 57.

A second exemplary embodiment of the annular snap in spring seal 52 illustrated in FIG. 2 includes the first seal end 53 having a symmetrical radially inner U-shaped bent first seal end 83 spring-loaded and revolvably secured in the at least one U-shaped slot 54. The U-shaped first seal end 83 includes annular substantially parallel axially spaced apart forward and aft legs 56, 58 connected by a cross-sectional U bend 60 or semi-circular cross-sectional bend therebetween. The parallel forward and aft legs 56, 58 are spring-loaded against parallel forward and aft walls 62, 64 respectively of the U-shaped slot 54 of the first turbine component 4. The aft leg 58 may be longer than the forward leg 56. An axially aftwardly opening conical section 70 is located radially between and connected to the aft leg 58 and a radially inner end of the first seal end 53.

Figure 3:
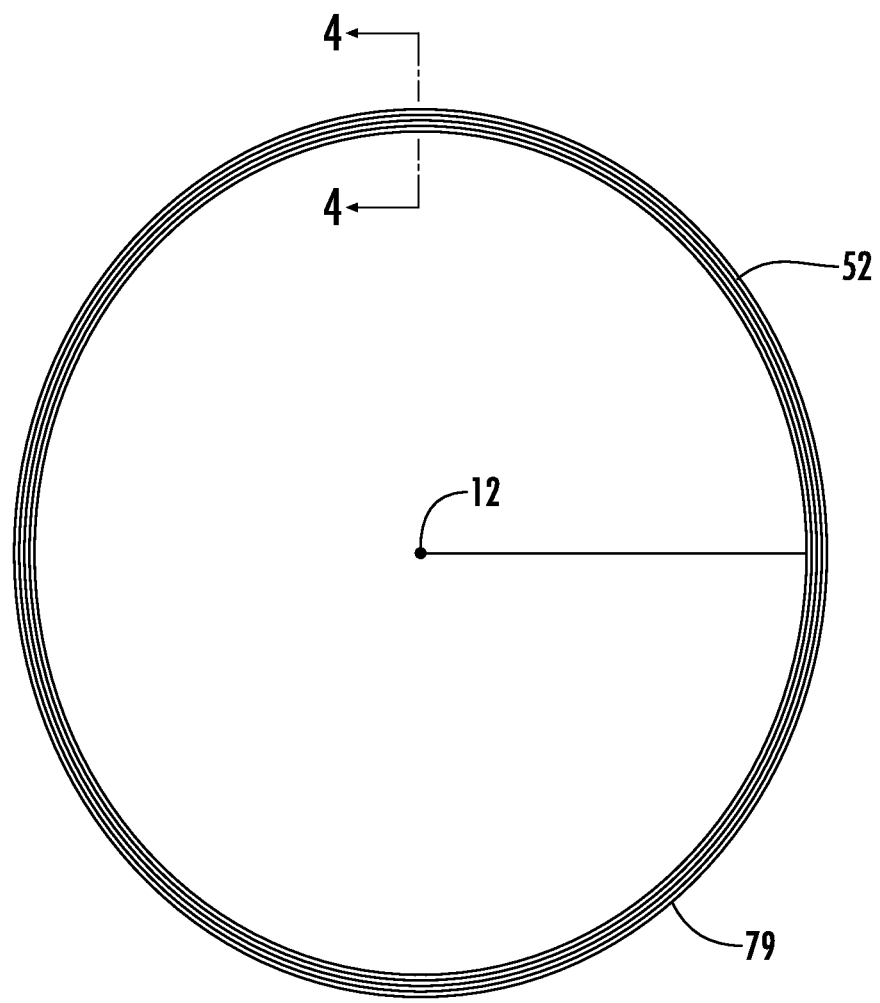
FIG. 3 is an axial view illustration of the exemplary embodiment of the seal illustrated in FIG. 2.
Figure 4:
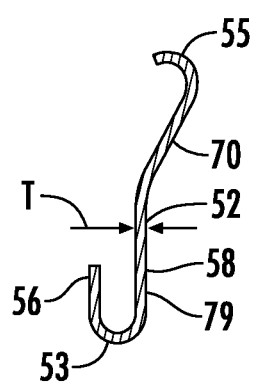
FIG. 4 is a circumferential view illustration of the seal through 4-4 in FIG. 3.

The U-shaped slot 54 and the forward annular wall 62 may be continuous around the engine and components as illustrated in FIG. 1. The U-shaped slot 54 may be continuous and segmented also. The U-shaped slot 54 may be discontinuous around the engine and components as illustrated in FIGS. 2 and 2A. The forward annular wall 62 may be discontinuous around the engine and include circumferentially spaced apart tabs 76 spaced axially apart from a continuous aft annular wall 64 of the U-shaped slot 54 as illustrated in FIGS. 2 and 2A. The continuous aft annular wall 64 provides a sealing surface. The annular snap in spring seal 52 is a full 360-degree ring 79 as illustrated in FIGS. 3 and 4 and may be split or continuous.

Figure 5:
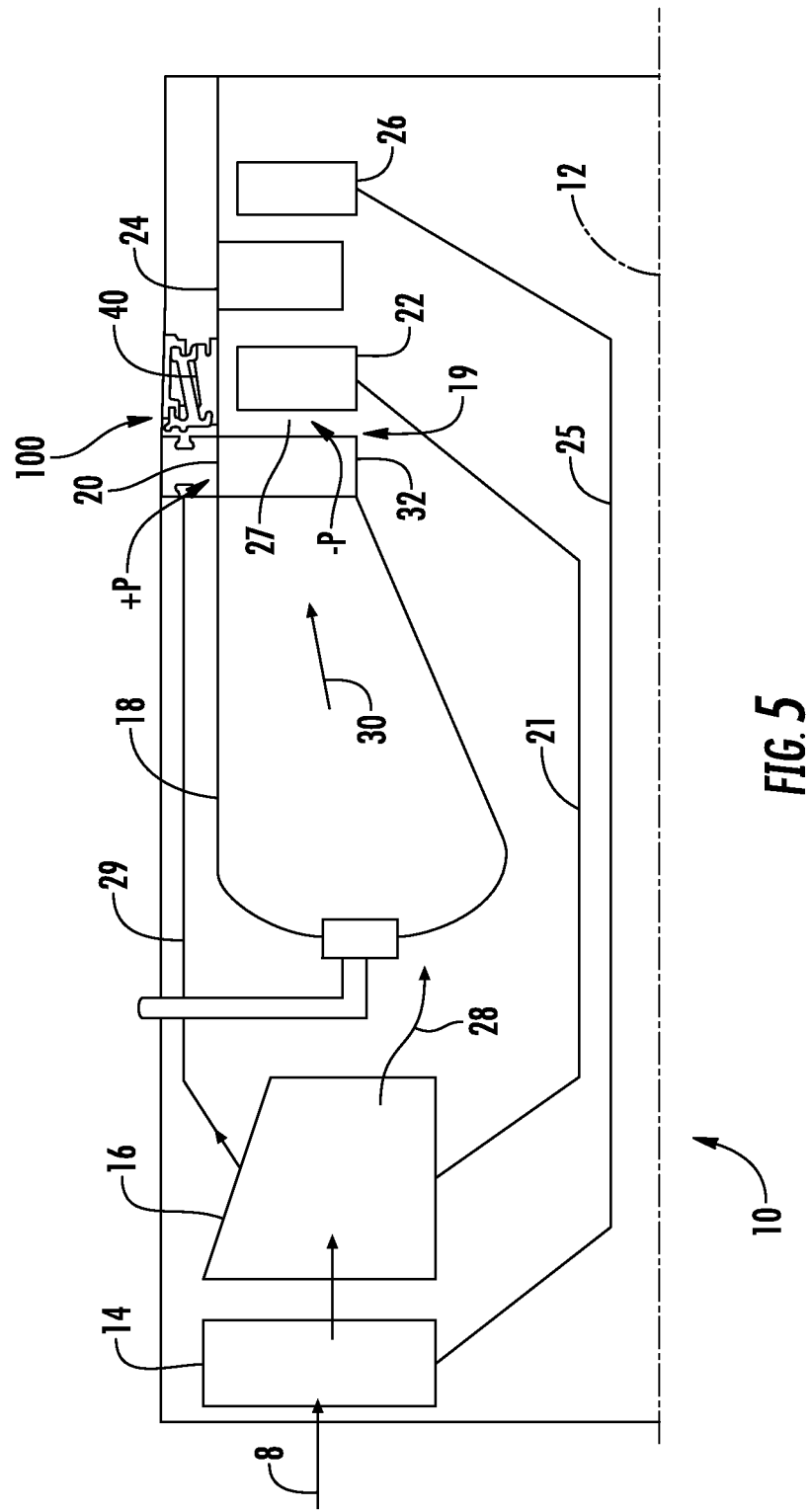
FIG. 5 is a schematic view illustration of an aircraft turbofan gas turbine engine with the snap in annular seal illustrated in FIG. 1 between a turbine nozzle and axially adjacent turbine shroud assembly.

Illustrated schematically in FIG. 5 is an exemplary aircraft turbofan gas turbine engine 10 which is axisymmetrical about a longitudinal or axial centerline axis 12. The engine 10 includes in serial flow communication, a fan 14, multi-stage axial compressor 16, annular combustor 18, a high-pressure turbine 19 including a high-pressure turbine nozzle 20 upstream of and followed by a single stage high pressure turbine rotor 22, and one or more stages of low-pressure turbine nozzles 24 and rotors 26. The high-pressure turbine rotor 22 is joined to the compressor 16 by a first shaft 21 and the low-pressure rotor 26 is joined to the fan 14 by a coaxial second shaft 25. During operation, ambient air 8 flows downstream through the fan 14, the compressor 16 from where it exits as compressed air 28 and is then flowed into the combustor 18. The compressed air 28 is mixed with fuel and ignited in the combustor 18 generating hot combustion gases 30, which flow downstream through turbine stages that extract energy therefrom for powering both the fan 14 and the compressor 16. The various stator and rotor components of the turbines downstream from the combustor 18 define a turbine flow path 27, which channels the hot combustion gases therethrough for discharge from the engine 10.

Downstream of and adjacent to the high-pressure turbine nozzle 20 is the high-pressure turbine rotor 22. The high-pressure turbine rotor 22 may take any conventional form having a plurality of circumferentially spaced apart turbine blades 23 extending radially outwardly from a rotor disk for extracting energy from the gases 30 and powering the compressor 16. A stationary shroud assembly 100, including turbine shroud segments 40, is located adjacent to and downstream of the turbine nozzle 20.

A portion of the compressed air 28 is bled from the compressor 16 and used as cooling air 29 which is channeled to various parts of the turbines such as the high-pressure nozzle 20 to provide cooling thereof. Some of the cooling air 29 is channeled around and through the high-pressure turbine nozzle 20 at a substantially high pressure +P compared to the low pressure −P of the combustion gases 30 flowing through the turbine flow path 27 in the high-pressure turbine nozzle 20 during engine operation.

Figure 6:
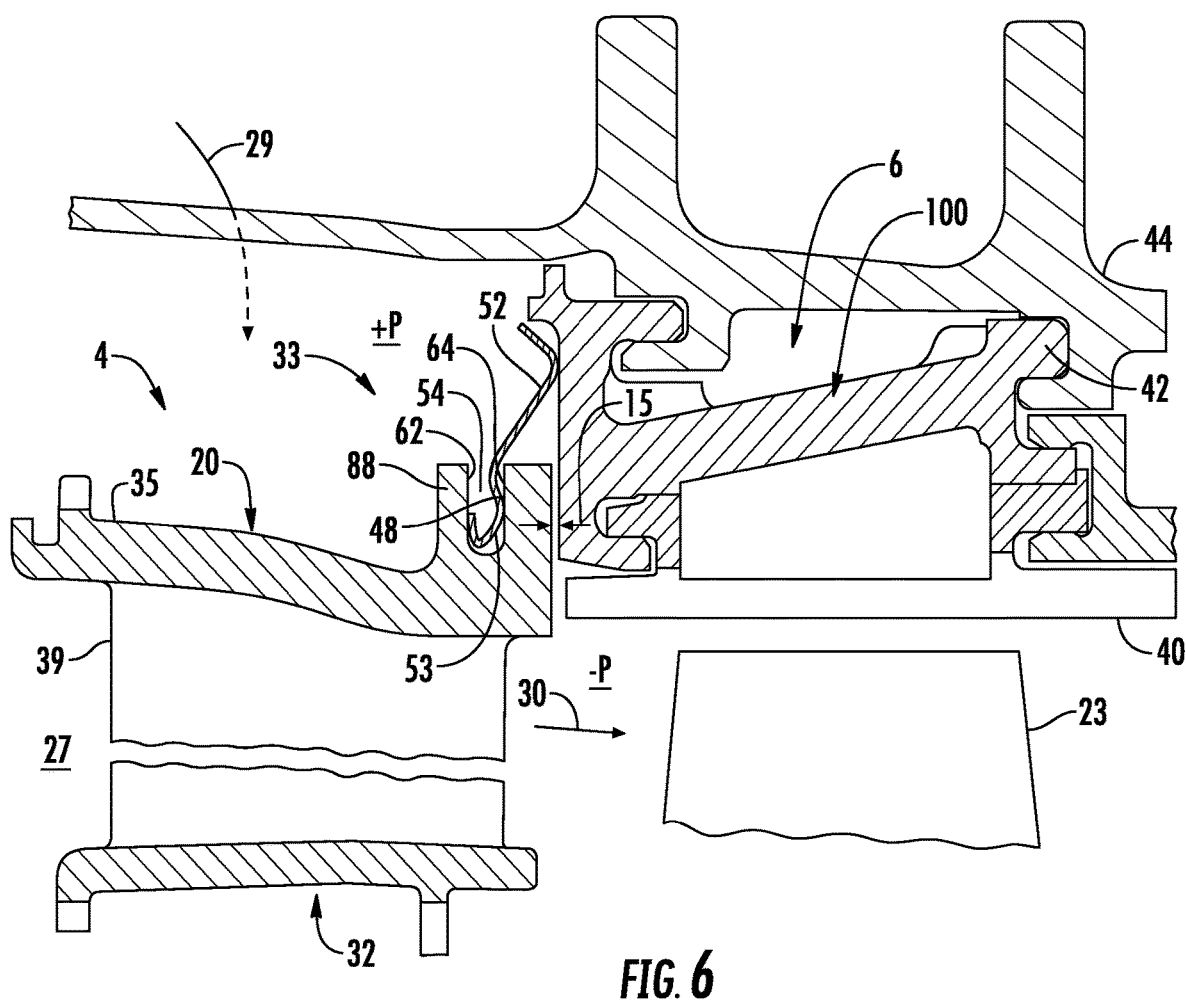
FIG. 6 is an enlarged perspective view illustration of the snap in annular seal illustrated between the turbine nozzle and axially adjacent turbine shroud assembly illustrated in FIG. 5.

Illustrated in FIG. 6 is an annular seal assembly 33 including an annular snap in spring seal 52 extending radially and circumferentially between and in sealing engagement with first and second annular turbine components, which are a high-pressure turbine nozzle 20 including turbine nozzle segments 32 and a stationary shroud assembly 100 including turbine shroud segments 40. The stationary shroud assembly 100 is located adjacent to axially downstream of the turbine nozzle 20 and bounds and confines flow path 27 radially outwardly of the turbine blades 23. The stationary shroud assembly 100 is made from a ring or plurality of circumferentially adjoining arcuate turbine shroud segments 40 supported from a plurality of circumferentially adjoining shroud hangers 42, which in turn, are supported from an annular outer casing 44 using forward and aft hooks and retention clips. The shroud segments 40 and hangers 42 are disposed coaxially with the turbine nozzle 20 for defining a radially outer flow path boundary around the turbine blades 23 through which the combustion gases 30 flow from the nozzle 20.

The cooling air 29 is channeled around the nozzle 20 and flows radially inwardly through the individual hollow stator airfoils 39 of the turbine nozzle 20 for cooling thereof and circulates around the outer surface of the outer band 35. The cooling air 29 is at a relatively high pressure +p compared to the lowered pressure −P of the combustion gases 30 channeled through the nozzle 20. The seal assembly 33 includes a U-shaped slot 54 in an aft flange 88 on each of the turbine nozzle segments 32 and parallel forward and aft walls 62, 64 of the slot 54. The annular snap in spring seal 52 designed to prevent or inhibit leakage through a gap 15 between the turbine nozzle 20 and the stationary shroud assembly 100. The annular snap in spring seal 52 includes a radially inner first seal end 53 spring-loaded and revolvably secured in at least one U-shaped slot 54 of the first turbine component 4. The first end 53 is spring-loaded against and between the parallel forward and aft annular walls 62, 64 of the U-shaped slot 54

The seal assembly 33 includes a U-shaped slot 54 in an aft flange 88 on each of the turbine nozzle segments 32 and parallel forward and aft walls 62, 64 of the slot 54. The annular snap in spring seal 52 designed to prevent or inhibit leakage through a gap 15 between the turbine nozzle 20 and the stationary shroud assembly 100. The annular snap in spring seal 52 includes a radially inner first seal end 53 spring-loaded and revolvably secured in at least one U-shaped slot 54 of the first turbine component 4. The first end 53 is spring-loaded against and between the parallel forward and aft annular walls 62, 64 of the U-shaped slot 54.

The annular snap in spring seal 52 has a low-profile snap in 360-degree axisymmetric construction and shape. No rivets or bolts are required, which improves durability of the assembly and the turbine nozzle, reduces leak paths, and allows modular assembly.

Integrating or fastening an inter-module seal mitigates the risk of assembly damage. The low-profile snap in cavity in conjunction with a 360-degree axisymmetric seal offers improved part durability and reduced leakage over headed or riveted attached seals.

Figure 7:
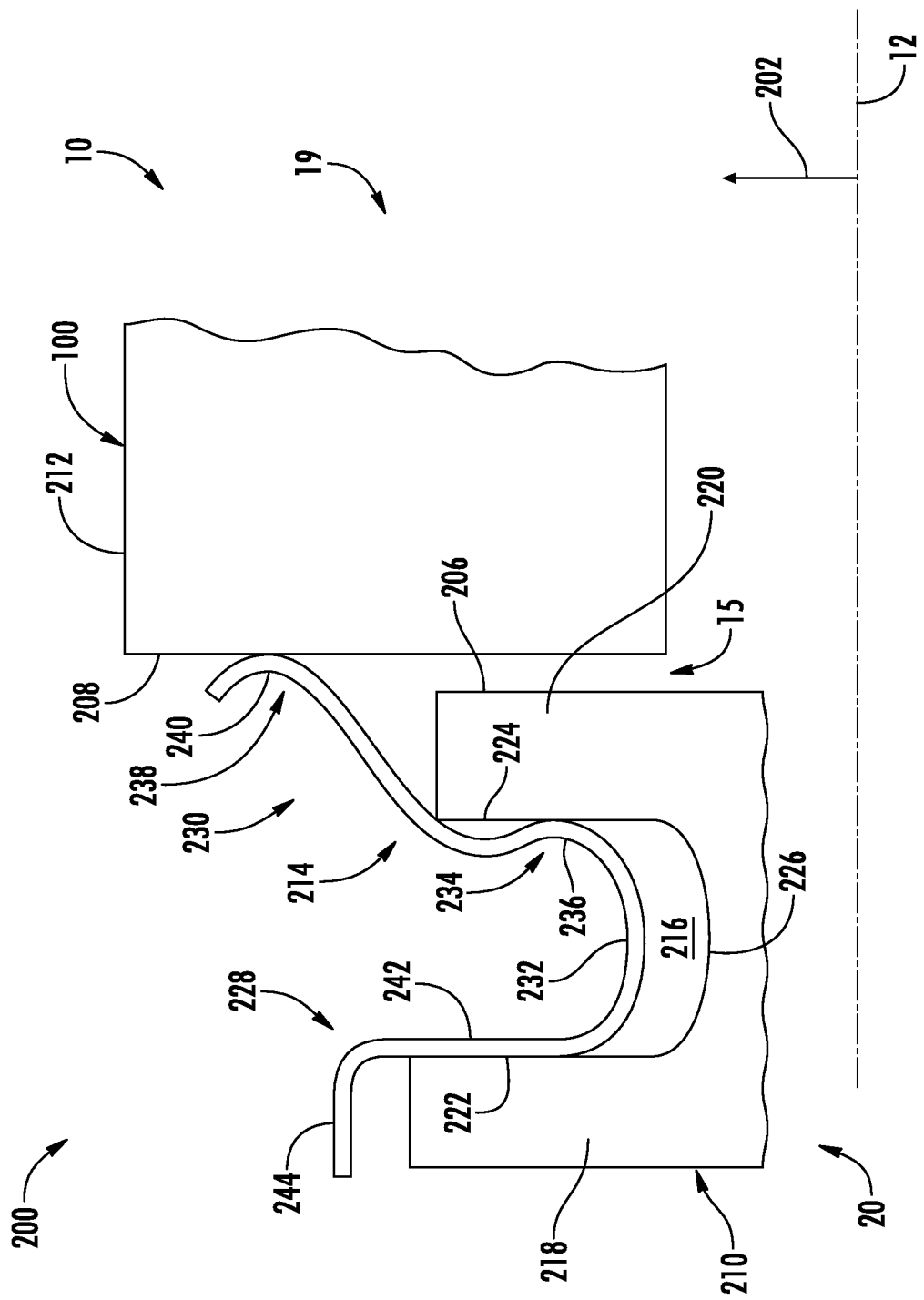
FIG. 7 is a sectional view of one embodiment of a gas turbine engine sealing assembly.

Referring now to FIG. 7, a sectional view of one embodiment of a sealing assembly 200 is illustrated in accordance with aspects of the present subject matter. In general, the sealing assembly 200 will be described herein with reference to the gas turbine engine 10 described above with reference to FIGS. 5 and 6. However, the disclosed assembly 200 may generally be used with gas turbine engines having any other suitable engine configuration.

As shown, the gas turbine engine 10 may define an axial centerline 12. Furthermore, the gas turbine engine 10 may define a radial direction 202 extending orthogonally outward from the axial centerline 12. Moreover, the gas turbine engine 10 may define a circumferential direction 204 (FIG. 8) extending circumferentially around the axial centerline 12.

In several embodiments, the sealing assembly 200 may include first and second turbine components. For example, in one embodiment, the first turbine component may correspond to the turbine nozzle 20 and the second turbine component may correspond to the shroud assembly 100. As indicated above, the shroud assembly 100 may be spaced apart from and positioned aft or otherwise downstream of the turbine nozzle 20 along the axial centerline 12. In this respect, a gap 15 may be defined between an aft or downstream surface 206 of a rail 210 of the turbine nozzle 20 and a forward or upstream surface 208 of a hanger or stator 212 of the shroud assembly 100. As will be described below, the sealing assembly 200 may include a seal 214 provided in sealing engagement with the turbine nozzle 20 and the shroud assembly 100 such that the seal 210 is configured to seal the gap 15. However, in alternative embodiments, the first and second turbine components may correspond to any other suitable turbine components of the gas turbine engine 10.

Furthermore, the first turbine component may define a slot therein. As shown, in several embodiments, the rail 210 of the turbine nozzle 20 may define a slot 216 therein. Specifically, in one embodiment, the rail 210 having a forward rail wall 218 and an aft rail wall 220 positioned aft or otherwise downstream of the forward rail wall 218 along the axial centerline 12. In this respect, the slot 216 may be defined between the forward and aft rail walls 218, 220 along the axial centerline 12. For example, the slot 216 may be defined between a first surface 222 of the forward rail wall 218 and a second surface 224 of the aft rail wall 220 along the axial centerline 12. Moreover, a radially inner surface 226 of the rail 210, which extends between the first and second surfaces 222, 224 along the axial centerline 12, may define the radially innermost portion of the slot 216. As shown, the slot 216 may be open at its radially outermost portion. Additionally, in several embodiments, the slot 216 may extend circumferentially around the axial centerline 12.

In accordance with aspects of the present subject matter, the sealing assembly 200 may include the seal 214. In general, and as indicated above, the seal 214 may be configured to seal the gap 15 defined between the seal rail 210 of the turbine nozzle 20 and the hanger 212 of the shroud assembly 100. In several embodiments, the seal 214 may include a forward leg 228, an aft leg 230, and a connection portion 232 coupling the forward and aft legs 228, 230. As will be described below, a portion of the forward leg 228 may be in non-sealing contact or engagement with the first surface 222 of the seal rail 210. Conversely, portions of the aft leg 230 may be in sealing contact or engagement with the second surface 224 of the seal rail 210 and the forward surface 208 of the hanger 212. In this respect, the seal 214 may seal the gap 15 by applying a sealing force against the seal rail 210 at the surfaces 222, 224 and against the hanger 212 at the surface 208, with such sealing force acting in the aft or downstream direction.

As indicated above, a portion of the aft leg 230 may be in sealing contact or engagement with the seal rail 210. More specifically, the aft leg 230 may include a first portion 234 of the seal 214 positioned within the slot 216 such that the first portion 234 is in contact with the second surface 224 of the aft rail 220 of the seal rail 210. Moreover, the seal 214 may be configured such that, when the first portion 234 is positioned within the slot 216, the first portion 234 exerts sufficient force on the second surface 224 to create a suitable seal therebetween. In one embodiment, the first portion 234 of the seal 214 may include a fillet 236 to permit the first portion 234 to slide relative to the second surface 224 (e.g., due to thermal gradients), while still maintaining the seal between the first portion 234 and the second surface 224. However, in alternative embodiments, the first portion 234 of the seal 214 may be configured in any other suitable manner that permits first portion 234 to sealingly engage the second surface 224 of the aft seal rail 220.

Additionally, as indicated above, a portion of the aft leg 230 may be in sealing contact or engagement with the hanger 212. More specifically, the aft leg 230 may include a second portion 238 of the seal 214 positioned radially outward from the slot 216 such that the second portion 238 is in contact with the forward surface 208 of the hanger 212. Moreover, the seal 214 may be configured such that, when the second portion 238 is contact with the forward surface 208, the second portion 238 exerts sufficient force on the forward surface 208 to create a suitable seal therebetween. In one embodiment, the second portion 238 of the seal 214 may include a fillet 240 to permit the second portion 238 to slide relative to the forward surface 208 (e.g., due to thermal gradients), while still maintaining the seal between the second portion 238 and the forward surface 208. However, in alternative embodiments, the second portion 238 of the seal 214 may be configured in any other suitable manner that permits second portion 238 sealingly engage the forward surface 208 of the hanger 212.

Moreover, as described above, a portion of the forward leg 228 may be a non-sealing contact or engagement with the seal rail 210. More specifically, the forward leg 228 may include a third portion 242 of the seal 214 positioned within the slot 216 such that the third portion 242 is in contact with the first surface 222 of the forward seal rail 218. Moreover, the seal 214 may be configured such that, when the third portion 242 is contact with the first surface 222, the third portion 242 exerts a reaction force on the first surface 222. Such reaction force may, in turn, not provide seal between the third portion 242 and the first surface 222. Instead, the reaction force may allow the first portion 234 of the seal 214 to exert a sealing force on the second surface 224 of the aft seal rail 224. However, in alternative embodiments, the third portion 242 of the seal 214 may be configured in any other suitable manner that permits second portion 228 to non-sealingly engage the first surface 222 of the seal rail 210.

In several embodiments, the forward leg 228 of the seal 214 may include a lip 244. In general, the lip 244 may be configured to retain the first and third portions 236, 242 of the seal 214 within the slot 216. Specifically, in one embodiment, the lip 244 may extend forward from the third portion 242 of the seal 214 along the axial centerline 12. As such, at least a portion of the lip 244 may be positioned forward of the first surface 222 of the seal rail 210. Moreover, in one embodiment, the lip 244 may generally be parallel to the axial centerline 12. However, in alternative embodiments, the lip 244 may have any other suitable configuration.

Figure 8:
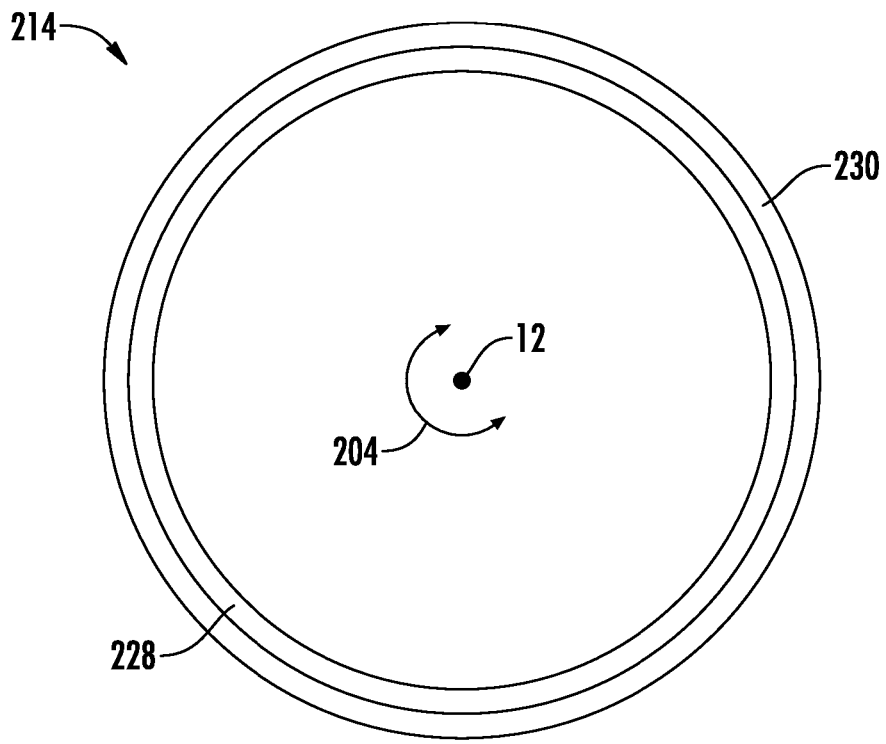
FIG. 8 is a front view of a seal of the gas turbine engine sealing assembly shown in FIG. 7

Referring now to FIG. 8, a front view of one embodiment of the seal 214 are illustrated in accordance with aspects of the present subject matter. As shown, in several embodiments, the seal 214 may generally extend circumferentially around the axial centerline 10 (i.e., along the circumferential direction 204). In this respect, the seal 214 may be configured to seal the gap 15 (FIG. 7) defined between the first and second components around the entire circumference of the gas turbine engine 10.

Figure 9:
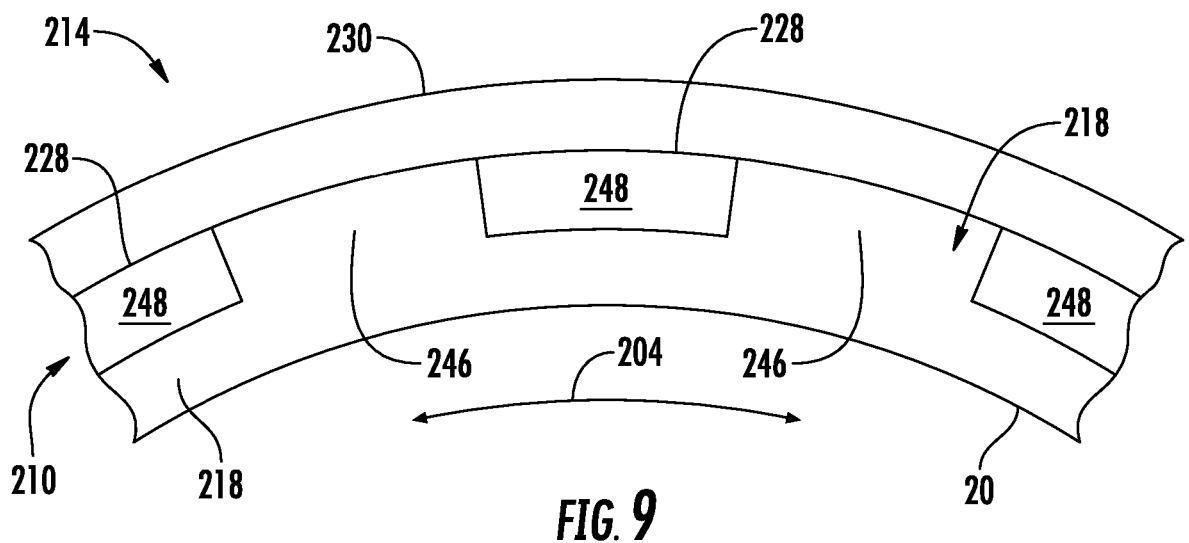
FIG. 9 is an enlarged front view of a portion of the sealing assembly shown in FIG. 7, illustrating a segmented forward rail of a turbine nozzle.

Referring now to FIG. 9, a front view of a portion of the sealing assembly 200 is illustrated in accordance with aspects of the present subject matter. Specifically, in several embodiments, the forward rail wall 218 of the seal rail 210 of the turbine nozzle 20 may be segmented. More specifically, the forward rail wall 218 may include a plurality of forward rail wall segments 246, with the segments 246 being spaced apart from each other along the circumferential direction 204. In this respect, a plurality of notches 248 may be defined between each adjacent pair of the forward leg segments 248. For example, in one embodiment, the forward rail wall segments 248 may occupy only twenty percent of the circumference of the forward rail wall 218, with the other eighty percent being occupied by the notches 248. Segmenting the forward rail wall 218 may reduce the weight of the sealing assembly 200. Furthermore, segmenting the forward rail wall 218 may reduce the chordal stress on the turbine nozzle 20, thereby improve the durability of the sealing assembly 200. However, in alternative embodiments, the forward leg 228 of the seal 214 may not be a continuous annular ring.

The sealing assembly 200 may provide one or more technical advantages. As described above, the seal 214 may seal a gap defined between the adjacent first and second components, such as the gap 15 defined between the seal rail 210 of the turbine nozzle 20 and the hanger 212 of the shroud assembly 100. In this respect, the seal 214 may sealingly engage the seal rail 210 and the shroud hanger 212 such that the sealing force applied to such components is directed in the aft or downstream direction relative to the direction of flow through the gas turbine engine 10. By applying the sealing force in such manner, the seal 214 may provide sufficient sealing, while remaining more flexible than conventional leaf seals.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

1. A sealing assembly for a turbine of a gas turbine engine, the sealing assembly comprising: a first turbine component including a first surface and a second surface positioned aft of the first surface along an axial centerline of the gas turbine engine, the first turbine component defining a slot positioned between the first surface and the second surface along the axial centerline; a second turbine component positioned aft of the first turbine component along the axial centerline, the first component and the second component defining a gap therebetween; and a seal configured to seal the gap defined between the first turbine component and the second turbine component, the seal comprising a first portion positioned within the slot such that the first portion exerts a sealing force on the second surface of the first component, the seal further comprising a second portion that exerts a sealing force on the second component.

2. The sealing assembly of clause 1, wherein the seal further comprises a third portion positioned within the slot such that the third portion exerts a non-sealing force on the first surface of the first component.

3. The sealing assembly of any preceding clause, wherein the first component includes a rail, the rail including the first surface, the rail defining a plurality of circumferentially spaced apart notches.

4. The sealing assembly of any preceding clause, wherein the seal comprises a forward leg partially in contact with the first surface of the first component and an aft leg positioned aft of the forward leg, the aft leg including the first portion of the seal and the second portion of the seal.

5. The sealing assembly of any preceding clause, wherein the seal further comprises a lip extending forward of the first surface along the axial centerline.

6. The sealing assembly of any preceding clause, wherein the lip is configured to retain the first portion of the seal within the slot.

7. The sealing assembly of any preceding clause, wherein the second portion of the seal comprises a fillet configured to permit the second portion to slide relative to the second component.

8. The sealing assembly of any preceding clause, wherein the first portion of the seal comprises a fillet.

9. The sealing assembly of any preceding clause, wherein the seal extends circumferentially around the axial centerline of the gas turbine engine.

10. The sealing assembly of any preceding clause, wherein the first component comprises a turbine nozzle and the second component comprises a shroud.

11. A gas turbine engine, comprising: a compressor; a combustor; and a turbine, comprising: a first turbine component including a first surface and a second surface positioned aft of the first surface along an axial centerline of the gas turbine engine, the first turbine component defining a slot positioned between the first surface and the second surface along the axial centerline; a second turbine component positioned aft of the first turbine component along the axial centerline, the first component and the second component defining a gap therebetween; and a seal configured to seal the gap defined between the first turbine component and the second turbine component, the seal comprising a first portion positioned within the slot such that the first portion exerts a sealing force on the second surface of the first component, the seal further comprising a second portion that exerts a sealing force on the second component.

12. The gas turbine engine of clause 11, wherein the seal further comprises a third portion positioned within the slot such that the third portion exerts a non-sealing force on the first surface of the first component.

13. The gas turbine engine of any preceding clause, wherein the first component includes a rail, the rail including the first surface, the rail defining a plurality of circumferentially spaced apart notches.

14. The gas turbine engine of any preceding clause, wherein the seal comprises a forward leg partially in contact with the first surface of the first component and an aft leg positioned aft of the forward leg, the aft leg including the first portion of the seal and the second portion of the seal.

15. The gas turbine engine of any preceding clause, wherein the seal further comprises a lip extending forward of the first surface along the axial centerline.

16. The gas turbine engine of any preceding clause, wherein the lip is configured to retain the first portion of the seal within the slot.

17. The gas turbine engine of any preceding clause, wherein the second portion of the seal comprises a fillet configured to permit the second portion to slide relative to the second component.

18. The gas turbine engine of any preceding clause, wherein the first portion of the seal comprises a fillet.

19. The gas turbine engine of any preceding clause, wherein the seal extends circumferentially around the axial centerline of the gas turbine engine.

20. The gas turbine engine of any preceding clause, wherein the first component comprises a turbine nozzle and the second component comprises a shroud.

What is claimed is:

1. A sealing assembly for a turbine of a gas turbine engine, the sealing assembly comprising:
a first turbine component including a first surface and a second surface positioned aft of the first surface along an axial centerline of the gas turbine engine, the first turbine component defining a slot positioned between the first surface and the second surface along the axial centerline;
a second turbine component positioned aft of the first turbine component along the axial centerline, the first turbine component and the second turbine component defining a gap therebetween; and
a seal configured to seal the gap defined between the first turbine component and the second turbine component, the seal comprising:
a first leg confronting the first surface; and
a second leg confronting the second surface, the second leg including a first portion positioned within the slot such that the first portion exerts a sealing force on the second surface of the first turbine component, and a second portion including at least a portion of the second leg, the second portion positioned such that the second portion exerts a sealing force on the second turbine component;
wherein the first portion of the seal is configured to exert a spring force against a corresponding portion of the slot, and wherein the spring force retains the seal within the slot.

2. The sealing assembly of claim 1, wherein the first leg includes a third portion positioned within the slot such that the third portion exerts a non-sealing force on the first surface of the first turbine component.

3. The sealing assembly of claim 2, wherein the first turbine component includes a rail, the rail including the first surface, the rail defining a plurality of circumferentially spaced apart notches.

4. The sealing assembly of claim 1, wherein the seal further comprises a lip extending forward of the first surface along the axial centerline.

5. The sealing assembly of claim 4, wherein the lip is configured to retain the first portion of the seal within the slot.

6. The sealing assembly of claim 1, wherein the second portion of the seal comprises a fillet configured to permit the second portion to slide relative to the second turbine component.

7. The sealing assembly of claim 1, wherein the first portion of the seal comprises a fillet.

8. The sealing assembly of claim 1, wherein the seal extends circumferentially around the axial centerline of the gas turbine engine.

9. The sealing assembly of claim 1, wherein the first turbine component comprises a turbine nozzle and the second turbine component comprises a shroud.

10. A gas turbine engine, comprising:
a compressor;
a combustor; and
a turbine, comprising:
a first turbine component including a first surface and a second surface positioned aft of the first surface along an axial centerline of the gas turbine engine, the first turbine component defining a slot positioned between the first surface and the second surface along the axial centerline;
a second turbine component positioned aft of the first turbine component along the axial centerline, the first turbine component and the second turbine component defining a gap therebetween; and
a seal configured to seal the gap defined between the first turbine component and the second turbine component, the seal comprising:
a first leg confronting the first surface; and
a second leg confronting the second surface, the second leg including a first portion positioned within the slot such that the first portion exerts a sealing force on the second surface of the first turbine component, and a second portion including at least a portion of the second leg, the second portion positioned such that the second portions exerts a sealing force on the second turbine component;
wherein the first portion of the seal is configured to exert a spring force against a corresponding portion of the slot, and wherein the spring force retains the seal within the slot.

11. The gas turbine engine of claim 10, wherein the first leg includes a third portion positioned within the slot such that the third portion exerts a nonsealing force on the first surface of the first turbine component.

12. The gas turbine engine of claim 11, wherein the first turbine component includes a rail, the rail including the first surface, the rail defining a plurality of circumferentially spaced apart notches.

13. The gas turbine engine of claim 10, wherein the seal further comprises a lip extending forward of the first surface along the axial centerline.

14. The gas turbine engine of claim 13, wherein the lip is configured to retain the first portion of the seal within the slot.

15. The gas turbine engine of claim 10, wherein the second portion of the seal comprises a fillet configured to permit the second portion to slide relative to the second turbine component.

16. The gas turbine engine of claim 10, wherein the first portion of the seal comprises a fillet.

17. The gas turbine engine of claim 10, wherein the seal extends circumferentially around the axial centerline of the gas turbine engine.

18. The gas turbine engine of claim 10, wherein the first turbine component comprises a turbine nozzle and the second turbine component comprises a shroud.

19. The sealing assembly of claim 1, wherein the second leg forms a continuous annular ring about the axial centerline.

20. The gas turbine engine of claim 1, wherein the second leg forms a continuous annular ring about the axial centerline.

* * * * *